June 10, 1958 M. P. LEBOURG 2,838,730
METHOD AND APPARATUS FOR DETERMINING THE
RESISTIVITY OF THE MUD IN A BORE HOLE
Filed June 23, 1953 2 Sheets-Sheet 1

INVENTOR.
MAURICE P. LEBOURG
BY
HIS ATTORNEYS.

June 10, 1958 M. P. LEBOURG 2,838,730
METHOD AND APPARATUS FOR DETERMINING THE
RESISTIVITY OF THE MUD IN A BORE HOLE
Filed June 23, 1953 2 Sheets-Sheet 2
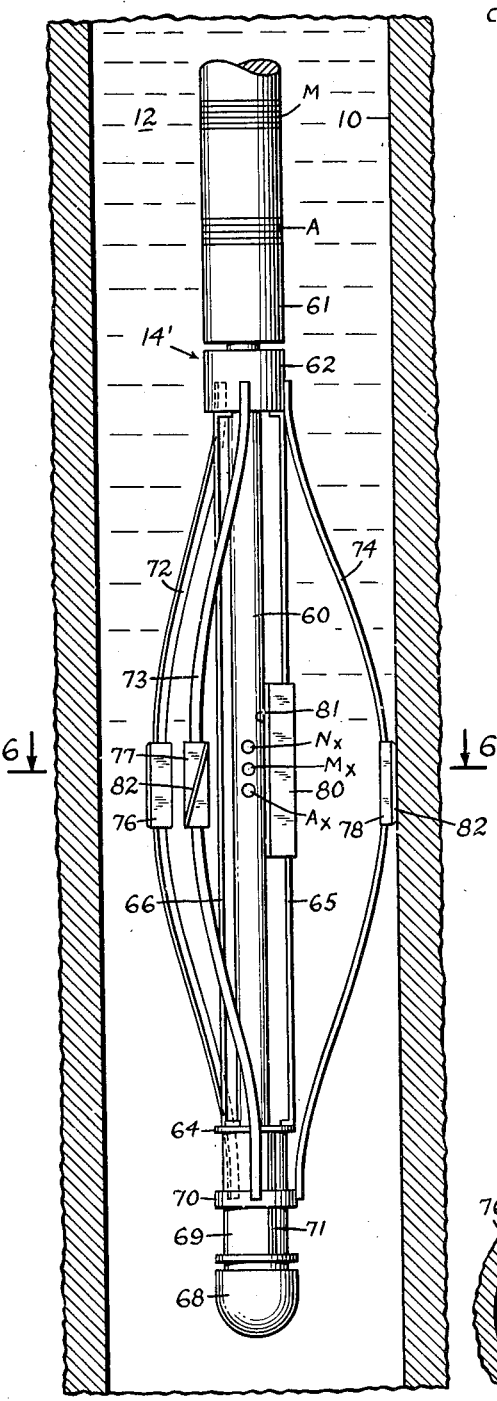
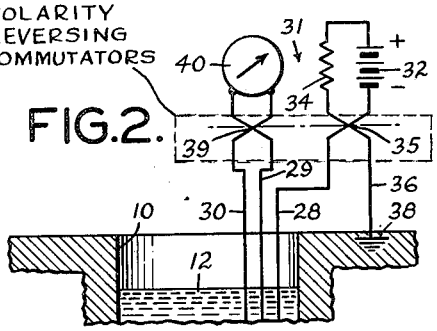
INVENTOR.
MAURICE P. LEBOURG
BY Campbell Brumbaugh
Free & Graves
HIS ATTORNEYS.

United States Patent Office 2,838,730
Patented June 10, 1958

2,838,730
METHOD AND APPARATUS FOR DETERMINING THE RESISTIVITY OF THE MUD IN A BORE HOLE

Maurice P. Lebourg, Houston, Tex., assignor, by mesne assignments, to Schlumberger Well Surveying Corporation, Houston, Tex., a corporation of Texas Application June 23, 1953, Serial No. 363,480

8 Claims. (Cl. 324—1)

This invention relates to electrical resistivity well logging, and, more particularly, pertains to new and improved methods and apparatus for determining the electrical resistivity of the mud in a bore hole.

In electrical resistivity well logging, it is often desirable to determine accurately the true resistivity of formations traversed by the bore hole. To accomplish this, the resistivity of the mud within the hole must be known at the levels of the formations of interest.

The resistivity of the mud varies with the depth of its location within the bore hole, primarily because of the increase in temperature within the bore hole with depth, as is usually characteristic of a bore hole. Usually the resistivity of the mud at the desired level is estimated by measuring its resistivity at the surface and computing an estimated resitivity on the basis of a known or estimated bottom hole temperature. Various apparatuses have been proposed to measure the mud resistivity along the bore hole, but these have not proved commercially practical, since they require a separate logging operation necessitating extensive idle time for expensive drilling crews.

It is, accordingly, an object of the present invention to provide new and improved methods and apparatuses for determining the resistivity of the mud in a bore hole in an expeditious, accurate and reliable manner.

Another object of the invention is to provide novel methods and apparatuses for determining mud resistivity permitting the use of simple and inexpensive apparatus affording entirely accurate results, which may be employed simultaneously with conventional electrical logging apparatus.

In accordance with the invention, mud resistivity may be determined by obtaining continuous resistivity indications, as a function of depth, which are substantially equal to the mud resistivity at the various levels in the bore hole at which the logging equipment currently is operating. For example, closely spaced current emitting and potential measuring electrodes may be mounted on a conventional logging housing to be passed through the bore hole. When the electrodes are not in the vicinity of the formations, the potential measurement is substantially only a function of the mud resistivity. Otherwise, the measurement is a function of both the resistivities of the mud and the surrounding material and is, in general, greater than the mud resistivity. By plotting a straight line curve through the low points of the potential measurement, an accurate indication of the mud resistivity along the bore hole may be obtained.

Alternatively, the closely spaced current emitting and potential measuring electrodes may be mounted on a modified logging housing provided with a suitable means for maintaining the housing in an essentially coaxial relation with respect to the bore hole, as it is passed therethrough. A mud wiper is arranged to clean the electrodes periodically as the housing travels in the bore hole. The potential measurement, thus obtained, is substantially a function of the mud resistivity. However, each time the wiper passes over the electrodes, the measurement momentarily varies to a distinguishably different value from a mean value representing the mud resistivity, thereby indicating that the wiper is operating. By plotting a straight line curve along the aforesaid mean value of the potential measurement, an indication of mud resistivity versus depth is obtained.

The invention may best be understood by reference to the following detailed description taken in conjunction with the accompanying drawings, in which:

Fig. 2 is a simplified circuit diagram of the apparatus shown in Fig. 1;

Figure 1:
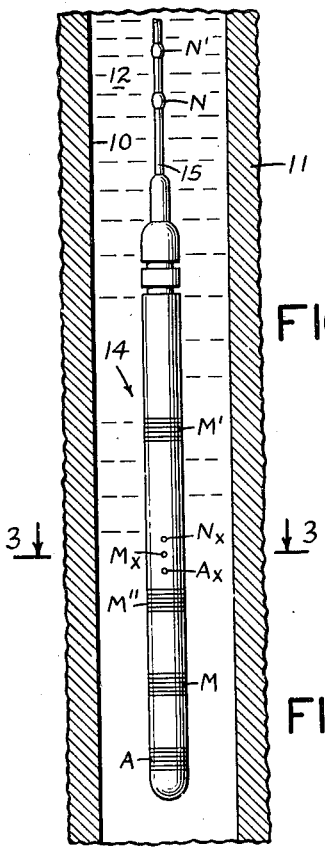
Fig. 1 is a schematic diagram of one embodiment of an electrical well logging apparatus disposed within a bore hole, including equipment capable of performing a method of determining mud resistivity, in accordance with the invention.
Figure 4:
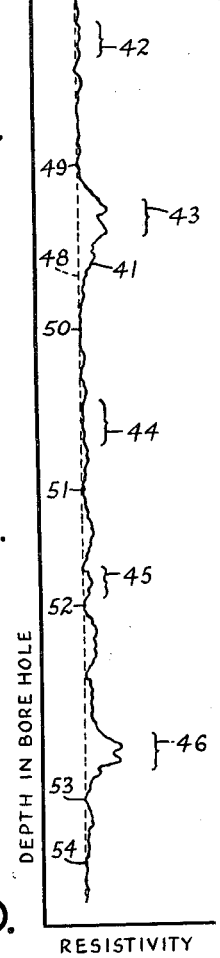
Figure 7:
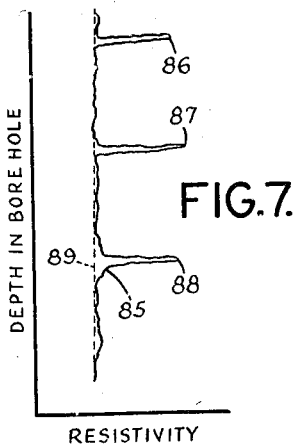
Figure 7A:
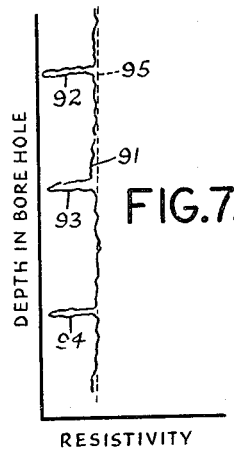

Figs. 3, 3A, 3B, 3C and 3D each represent a cross-sectional view taken along the line 3—3 of Fig. 1, looking in the direction of the arrows, and illustrate various positions the equipment may take while traversing a drill hole;

Fig. 4 is an exemplary curve, which may be obtained through the use of the apparatus shown in Fig. 1, and is illustrative of the manner of carrying out a portion of the steps in accordance with the inventive method of mud resistivity determination;

Fig. 5 is a view in elevation of another embodiment of a drill hole equipment, constructed in accordance with the invention;

Fig. 6 is a cross-sectional view taken along the line 6—6 of Fig. 5 and looking in the direction of the arrows; and Figs. 7 and 7A are exemplary curves which may be obtained through the use of the apparatus shown in Fig. 5, in accordance with the invention.

Referring to Fig. 1, there are shown earth formations 11 traversed by a bore hole 10, which may contain an electrically conductive drilling fluid 12, such as a water base mud. An electrode carrier 14 is suspended in the bore hole 10 by a conventional cable 15 having a plurality of insulated electrical conductors therein. The electrodes A, M, M', M'', N and N', may be distributed on the carrier 14 and on an adjacent portion of the cable 15, in accordance with any suitable conventional electrical logging technique, and the carrier 14 may be raised and lowered in the bore hole by conventional means (not shown). The electrodes, in turn, may be connected through insulated conductors in the cable 15 to any conventional measuring and recording equipment and power source (not shown), suitable for making conventional electrical resistivity and spontaneous potential measurements of the earth formations traversed by the bore hole 10. The electrodes A, M, M' and M'' may be conventional wire loops mounted in the periphery of the carrier 14, and insulated therefrom.

Three closely spaced electrodes $A_x$, $M_x$ and $N_x$ may be disposed in vertical alignment along the carrier 14. These electrodes may be electrically insulated from the carrier, from each other and from the other electrodes on the carrier. They may be connected through conductors in the cable 15 to a power source and measuring equipment, as shown in Fig. 2.

The simplified circuit diagram of Fig. 2 shows the conventional electrodes A, M, M'', M', N and N' disposed within the bore hole 10 along with the three closely spaced electrodes $A_x$, $M_x$ and $N_x$. The electrodes A, M, M'', N and N' are connected by the conductors 20, 21, 22, 23, 24 and 25, respectively, to conventional apparatus for obtaining simultaneous indications of spontaneous potentials and formation electrical resistivity in the bore hole 10.

The electrodes $A_x$, $M_x$ and $N_x$ are connected by the conductor 28, 29 and 30, respectively, to a mud resistivity measuring and indicating apparatus 31. The measuring apparatus 31 may include a constant current source, such as, for example, a battery 32 in series with a current limiting resistor 34 having a high resistance value. The electrode $A_x$ is connected by the conductor 28, through a polarity reversing commutator 35, the battery 32, the resistor 34, back through the commutator 35, and a conductor 36 to a remote reference point or ground 38. The electrodes $M_x$ and $N_x$ are connected by the conductors 29 and 30 through another polarity reversing commutator 39 to a potential measuring and recording instrument 40. The polarity reversing commutator 39 is synchronized with the commutator 35 so that it operates as a synchronous rectifier.

In operation, the apparatus of Figs. 1 and 2 provides means for simultaneously measuring the electrical resistivity of the earth formations, spontaneous potentials in the bore hole, and the electrical resistivity of the mud, as the carrier 14 traverses the bore hole.

In making mud resistivity measurements, constant current is emitted from the electrode $A_x$, which may be of a low intensity relatively to the resistivity logging current and indications are obtained of the potential difference between the electrodes $M_x$ and $N_x$. Since the current emitted by the electrode $A_x$ is substantially constant and the electrode spacing (i. e., the distance from the electrode $A_x$ to the midpoint between the electrodes $M_x$ and $N_x$) is small, preferably less than the radius of the bore hole, the potential difference between the electrodes $M_x$ and $N_x$ with the electrode array centered in the bore hole, as shown in Fig. 1, is substantially a direct function of the resistivity of a small segment of the mud column. The recording instrument 40 should be suitably calibrated so that a record may be made of the resistivity of the material within the influence of the closely spaced electrodes $A_x$, $M_x$ and $N_x$.

However, the response of the instrument 40 may not always be directly proportional to the electrical resistivity of the mud as the carrier 14 traverses the bore hole. The position of the closely spaced electrode group $A_x$, $M_x$ and $N_x$ relatively to the side wall of the bore hole 10 will have a direct effect on the readings recorded by the recording instrument 40. This will be apparent from a study of Figs. 3, 3A, 3B, 3C and 3D, and Fig. 4.

Figure 3:
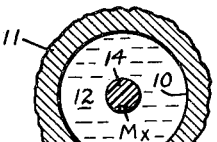
Figure 3A:
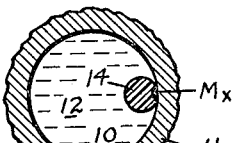
Figure 3B:
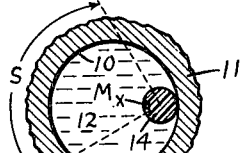
Figure 3C:
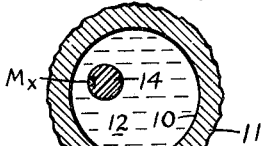
Figure 3D:
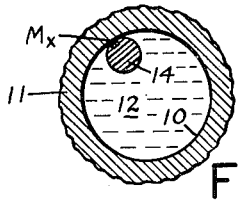

In the position illustrated in Fig. 1, the carrier 14 is perfectly centered in the bore hole 10, as best shown in Fig. 3. However, since, in the usual case, the inclination or deviation from the true vertical of the bore hole varies with depth, the carrier may take a variety of positions therein. For example, the carrier 14 may engage the side wall of the hole with the mud electrodes in direct contact therewith, as shown in Fig. 3A. Farther down the bore hole 10, the carrier may still be in engagement with the wall, but may rotate to a position wherein the mud electrodes face towards the center of the hole. This condition is represented in Fig. 3B. In Fig. 3C, the mud electrodes again approach the wall of the bore hole 10 and in Fig. 3D are shown in engagement therewith. Hence, a curve 41 of mud resistivity versus depth, such as shown in Fig. 4, may be obtained.

The correspondence of various portions of this curve with the different carrier positions illustrated in Figs. 3, 3A, 3B, 3C and 3D may be explained as follows: The section 42 of the resistivity curve of Fig. 4 is almost straight and of a substantially constant value. It is illustrative of essentially coaxial movement of the carrier relatively to the bore hole 10, in a position such as shown in Fig. 3.

For the condition shown in Fig. 3A, the mud electrodes are in contact with the wall of the bore hole 10 and thus the resistivity measurement is modified by the resistivity of the adjacent earth formations. This condition is represented by the section 43 of the resistivity curve of Fig. 4, which is of considerably higher resistivity than the section 42.

The curve section 44 of Fig. 4, illustrating the condition represented in Fig. 3B, is essentially linear. This position provides an accurate mud resistivity measurement because, although the housing 14 is in engagement with the bore hole wall, if the mud electrodes are anywhere within an arc S, the mud resistivity alone is measured.

In Fig. 3C, the mud electrodes are close by, but are not in engagement with, the side wall of the bore hole 10. The resistivity measurement obtained for that position approaches, but is not precisely the mud resistivity, as shown by the curve section 45 of Fig. 4.

Finally, in the position of Fig. 3D, the mud electrodes again engage the bore hole wall and the formation resistivity modifies the measurement as indicated by the curve section 46 of Fig. 4, showing high resistivity.

From an inspection of Fig. 4, it may be observed that a substantially straight line curve 48, shown in broken form, may be projected along successive, aligned portions 42, 49, 50, 44, 51, 52, 53 and 54 of the resistivity curve 41 by interconnecting the low points of the resistivity curve. Since, in general, the resistivity of the mud 12 is lower than the formation resistivities, the line 48 delineates another curve representative of mud resistivity versus depth. Thus, the resistivity of the mud at any depth of the bore hole 10 may be derived from the curve 48 without the need for computations taking into account conditions of temperature and/or pressure.

Since the mud electrodes $A_x$, $M_x$ and $N_x$ may from time to time engage the side wall of the bore hole 10 as the carrier 14 travels through it, this will remove any mud cake which tends to accumulate thereon.

Thus, it is apparent that the resistivity measurements of the mud may be made with great accuracy and reliability. Moreover, a relatively simple arrangement of three electrodes $A_x$, $M_x$ and $N_x$ and associated surface equipment is all that is necessary for performing mud resistivity measurements concurrently with conventional resistivity logging operations.

Although the simultaneous operation of the conventional and mud electrode systems has been illustrated and described, various other operating arrangements may be suitably employed. For example, a relay system may be incorporated in the carrier 14, so that some of the cable conductors may be selectively switched from electrodes in the conventional array to the mud electrodes, thereby permitting a reduction in the number of cable conductors required. In this case, a log of mud resistivity may be made during a trip of the carrier 14 down the bore hole and a conventional log recorded on the return trip up the bore hole.

Alternatively, known systems of multiplexing may be utilized to permit simultaneous operation of the conventional and mud electrodes without increasing the number of required cable conductors.

An alternate embodiment of the invention is shown in Fig. 5, wherein a modified carrier 14' includes a shaft portion 60 of an essentially cylindrical configuration extending downwardly from a portion 61 of the carrier 14', on which the lowermost electrode A is situated. Upper and lower collars 62 and 64, respectively, are rotatably supported in fixed axial positions at the extremities of the portion 60 and are connected together for simultaneous rotation by a plurality of rods 65 and 66, which also serve to maintain a predetermined axial spacing between the collars 62 and 64.

An enlarged end member 68 serves to retain the collar 64 on the shaft portion 60. The collar 64 may be of a generally flanged configuration, including a section 69 of reduced diameter upon which another slidable collar 70 is supported for axial movement. A key 71, axially disposed on the reduced section 69 of the collar 64, may be received by a key way (not shown) in the collar 70.

Thus, the members 64 and 70 are movable axially relative to one another, and, at the same time, are keyed for simultaneous rotation about the portion 60 of the carrier 14′.

Three similar bowed leaf springs 72, 73 and 74 are fastened at equally spaced points about the periphery of the collar 62, with their free ends, likewise, secured to equally spaced points about the periphery of the collar 70. Each of the springs 72, 73 and 74 is provided with centrally located wall engaging pads 76, 77 and 78, respectively, facing outwardly with respect to the body of the carrier 14′. Each pad is biased by its associated spring into engagement with the side wall of the bore hole 10, as shown in Fig. 6. Variations in bore hole diameter may be accommodated by the bowing of the springs inwardly or outwardly, this movement being permitted by an axial displacement of the collar 70 along the portion 69 of the flanged collar 64. Thus, as may be best seen in Fig. 6, the lower portion of the carrier 14′ is maintained in axial alignment with the bore hole as it travels therethrough, despite variations in inclination or diameter.

In accordance with the invention, the shaft portion 60 of the carrier 14′ may be provided with mud electrodes $A_x$, $M_x$ and $N_x$, which may be electrically connected with the measuring and indicating equipment, in the manner shown in Fig. 2. The electrodes preferably should be electrically insulated from the section 60, if it is composed of an electrically conductive material. A wiper blade 80 is secured to the brace rod 65. The wiper blade 80 is provided with a knife-like edge 81, which is maintained in slidable engagement with the outer surface of the housing portion 60. The edge 81 may have a length at least equal to the distance between the outermost mud electrodes $A_x$ and $N_x$ and may be positioned so as to wipe all the mud electrodes as it moves over them. This wiping action may occur in response to the rotation of the collars 62 and 64. In order to effect such rotation, each of the pads 76, 77 and 78 is provided with a diagonal, raised ridge 82, positioned for engagement with the side wall of the bore hole 10.

Thus, whenever the housing is lowered or raised in the hole, the ridges 82, because of their inclination with respect to the axis of the carrier 14′, cause rotation of the bowed springs 72, 73 and 74, thereby rotating the collars 62 and 64, and causing the wiper 81, periodically, to rotate about the shaft portion 60 of the carrier 14′. As a result, the mud electrodes $A_x$, $M_x$ and $N_x$ periodically are cleaned of mud cake formed thereon.

Otherwise, the operation of the embodiment shown in Fig. 5 is very similar to that of Figs. 1 and 2. Specifically, an electrical current is applied continuously along the bore hole 10 through the mud electrode $A_x$ and a ground return (not shown), and the resulting potential difference between the electrodes $M_x$ and $N_x$ is continuously measured. Thus, a curve of resistivity versus depth may be recorded in response to the potential measurements. A straight line curve may be projected then along the aligned portions of the aforesaid curve, thereby delineating another curve representing mud resistivity.

If the wiper 80 is composed of an electrical insulating material having an electrical resistivity much greater than that of the mud, the measured resistivity will increase sharply each time it passes over the mud electrodes. Thus, as shown in Fig. 7, the resistivity versus depth curve 85 for the apparatus shown in Fig. 5 exhibits sharp peaks of high resistance 86, 87 and 88, which correspond to each passage of the wiper 80 over the mud electrodes and which are indicative of the operation of the wiper. However, a straight line curve 89 may be projected along the aligned portions of the curve and would be representative of the true resistivity of the mud column 12 in the bore hole 10.

Alternatively, the wiper 80 may be composed of an electrically conductive material. In this case, a resistivity versus depth curve 91, such as shown in Fig. 7A, may be obtained. This curve exhibits sharp peaks 92, 93 and 94 of very low resistivity. A straight line curve 95 may be projected along aligned portions of the curve and would be representative of the resistivity of the mud column.

It is, therefore, apparent that the device represented in Fig. 5, while of simple and inexpensive construction, affords accurate results in the determination of the mud resistivity in bore holes during conventional resistivity logging operations.

It will be understood by those skilled in the art that the disclosed embodiments are merely exemplary and are susceptible of modification and variation without departing from the spirit and scope of the invention. For example, although in the embodiment shown in Fig. 5, the collars 62 and 64 are axially fixed relatively to the housing portions 61 and 68, they may be axially movable. This may be accomplished in the following manner: the spacing between the collars 62 and 64 may be less than the spacing between the housing portions 61 and 68, and the wiper blade 80 may be considerably longer than that shown and may be fixed to but one of the collars. Thus, the rods 65 and 66, and the collar 70 would not be needed for the modified arrangement, since the bowed springs 72, 73 and 74 can be fixed to the collar 64 and serve to gang the collars for simultaneous movement.

While a three electrode array is described above and shown in the accompanying drawings, it will be understood that other electrical resistivity logging electrode arrays may be used, provided only that the spacing between the electrodes is made small enough to render the system responsive principally to the electrical resistivity of the bore hole liquid.

Therefore, the invention is not deemed to be limited to the embodiments described herein but its scope is defined by the appended claims.

I claim:

1. In a method for determining the electrical resistivity of conductive fluid within a bore hole, the steps of moving a current emitting electrode through the conductive fluid in the bore hole, obtaining continuous indications of the potential difference between a reference point and a point in fixed nearby relation to said electrode when said electrode is at different depths in the bore hole, inscribing said continuous indications of potential difference on a recording medium, and inscribing a substantially straight line curve on said recording medium connecting a plurality of extreme values of said continuous indications, thereby providing a representation of the resistivity of said conductive fluid as a function of depth in the bore hole.

2. In a method for determining the electrical resistivity of conductive fluid within a bore hole, the steps of moving a current emitting electrode through the conductive fluid in the bore hole, obtaining continuous indications of the potential difference between two closely spaced electrodes in close proximity to said current emitting electrode, recording in a continuous manner said potential difference as a function of the depth of said electrode in the bore hole in order to enable the electrical resistivity of said conductive fluid to be determined from a plurality of extreme values of said potential differences representative of the resistivity of said conductive fluid, and periodically wiping the surfaces of said electrodes with wiping means having a resistivity differing substantially from the resistivity of said conductive fluid so that periodic variations in the recorded potential difference would be indicative of continued wiping action and that said electrodes would be maintained substantially clean during the logging operation.

3. In apparatus for investigating the electrical resistivity of conductive fluid in a bore hole, the combination of at least two closely spaced electrodes mounted for movement through the bore hole in insulating relation, means for maintaining said electrodes in fixed relation away from the wall of the bore hole, a source of electrical energy connected to one of said electrodes and to a reference point to establish an electric field in said conductive fluid, electrical indicating means connected to the other of said electrodes and to a reference point for obtaining continuous indications responsive to said electric field as a function of the depth of said electrodes in the bore hole, and means having a resistivity substantially different from that of said conductive fluid for periodically wiping the surfaces of said electrodes so as to maintain said electrodes substantially clean during a logging operation and for providing a relatively frequent indication of the wiping action.

4. In apparatus for investigating the electrical resistivity of conductive fluid in a bore hole, the combination of three closely spaced electrodes mounted for movement through the bore hole, in insulated relation, means for maintaining said electrodes centered in the bore hole, means having a resistivity substantially different from that of said conductive fluid and responsive to movement of said electrodes along the bore hole for periodically wiping the surfaces of said electrodes and for providing a relatively frequent indication of the wiping action, a source of electrical energy connected to one of said electrodes and to a reference point for establishing an electric field in said conductive fluid, and electrical indicating means connected to the remaining two electrodes for obtaining continuous indications responsive to said electric field as a function of the depth of said electrodes in the bore hole.

5. Apparatus as defined in claim 4 in which the wiping means is relatively conductive with respect to the conductive fluid.

6. Apparatus as defined in claim 4 in which the wiping means is relatively nonconductive with respect to the conductive fluid.

7. In apparatus for investigating the electrical resistivity of conductive fluid in a bore hole, the combination of a body member adapted to be lowered into the bore hole, centering means carried by the body and mounted for rotation about the longitudinal axis thereof without translation therealong, means responsive to movement of said body member longitudinally of the bore hole for imparting rotational movement to said centering means about said longitudinal axis, a plurality of electrodes carried by said body member in fixed, closely spaced and insulated relation, wiper means mounted for movement in accordance with rotation of said centering means for periodically wiping the surfaces of said electrodes, a source of electrical energy connected to one of said electrodes and to a reference point, and electrical indicating means connected to receive the potential difference between two other of said electrodes.

8. Apparatus as defined in claim 7 in which the electrical energy source provides D. C., first commutator means is interposed between said source and said one electrode, and second commutator means operated in corresponding timed relation to said first commutator means is interposed between said electrical indicating means and said two other electrodes.

References Cited in the file of this patent

UNITED STATES PATENTS

| | | |
|---|---|---|
| 1,668,434 | Todd | May 1, 1928 |
| 2,397,254 | Ennis | Mar. 26, 1946 |
| 2,400,678 | Archie | May 21, 1946 |
| 2,414,194 | Ennis | Jan. 14, 1947 |
| 2,669,690 | Doll | Feb. 16, 1954 |
| 2,754,475 | Norelius | July 10, 1956 |

OTHER REFERENCES

"Geophysical Exploration," by Heiland, 1940, Prentice-Hall, New York City, pp. 826–830.